United States Patent
Dobrosavljevic et al.

(10) Patent No.: US 7,937,038 B2
(45) Date of Patent: May 3, 2011

(54) CONNECTION INHIBITION APPARATUS AND METHOD

(75) Inventors: Zoran Dobrosavljevic, Southampton (GB); Anthony Peter Hulbert, Southampton (GB)

(73) Assignee: Aeromobile Communications Limited, West Sussex (GB)

( * ) Notice: Subject to any disclaimer, the term of this patent is extended or adjusted under 35 U.S.C. 154(b) by 835 days.

(21) Appl. No.: 11/887,770

(22) PCT Filed: Mar. 31, 2006

(86) PCT No.: PCT/US2006/011787
§ 371 (c)(1),
(2), (4) Date: Oct. 3, 2007

(87) PCT Pub. No.: WO2006/107725
PCT Pub. Date: Oct. 12, 2006

(65) Prior Publication Data
US 2009/0215386 A1 Aug. 27, 2009

(30) Foreign Application Priority Data
Apr. 6, 2005 (GB) .................................. 0507057

(51) Int. Cl.
*H04K 3/00* (2006.01)

(52) U.S. Cl. ....... 455/1; 455/426.1; 455/562.1; 370/527
(58) Field of Classification Search .................. 455/522, 455/562.1, 517, 1, 450, 561, 456.6, 426.1, 455/403; 370/210, 215, 212, 310.2, 328, 370/334, 338, 433, 527
See application file for complete search history.

(56) References Cited

U.S. PATENT DOCUMENTS

| 2003/0224719 | A1 | 12/2003 | Lucidarme et al. |
| 2004/0152481 | A1* | 8/2004 | Georgeaux et al. ............ 455/522 |
| 2005/0085267 | A1* | 4/2005 | Lemson et al. ............ 455/562.1 |
| 2005/0206551 | A1* | 9/2005 | Komiak et al. .................. 342/42 |
| 2008/0089392 | A1* | 4/2008 | Anglin, Jr. .................... 375/139 |

FOREIGN PATENT DOCUMENTS

| EP | 0 546 849 A2 | 6/1993 |
| WO | WO 00/54538 | 9/2000 |
| WO | WO 02/078384 A1 | 10/2002 |

* cited by examiner

*Primary Examiner* — Sujatha Sharma
(74) *Attorney, Agent, or Firm* — Oliff & Berridge, PLC (57) ABSTRACT

The apparatus transmits in a first zone, for example, an aircraft, a masking signal which masks transmissions from a second zone outside of the first. By doing this a mobile cellular telephone is inhibited from connecting or attempting to connect to base-stations on the ground. A hole in the masking signal spectrum may be provided to enable connection to a base-station within the aircraft. Alternatively, a base-station within the aircraft may be arranged to transmit at a power level greater than the masking signal.

51 Claims, 8 Drawing Sheets

CONNECTION INHIBITION APPARATUS AND METHOD

BACKGROUND

This invention relates to apparatus for inhibiting connection of communication equipment to communication infrastructure.

SUMMARY

It is undesirable for mobiles to be used in particular circumstances. The signals emanating from the mobile are considered by some to be potentially interfering with, for example, the aircraft flight systems or other sensitive equipment. Another issue is that the mobile may, from a high flying aircraft, seek to interact with a number of base-sites serving disparate geographical areas.

It is therefore desirable to provide an on-board local cell site to serve the mobiles in such a way that those mobiles are controlled to operate using minimum transmitted power. This may also serve as an additional revenue stream for the aircraft operator as well as preventing interference to ground based infrastructure.

When switched on, mobiles scan the available frequencies to "find" a base-station. Thus, it is possible for a mobile to encounter a ground based base-station before encountering an on-board base-station. It is desirable to prevent this.

Accordingly, in a first aspect the invention relates to connection inhibition apparatus to prevent a mobile communication apparatus in a first zone connecting to a base station in a second zone outside of the first which connection inhibition apparatus comprising means to transmit a masking signal at the frequency or frequencies of the base-station within the first zone to mask transmissions from the second zone to inhibit connection thereto.

In the case of an aircraft, the first zone would be the flight cabin and the second zone will be outside of the aircraft.

The inventors have also appreciated that the transmitted masking signal will be subject to multipath Rayleigh fading within the first zone. Thus, there will be locations within the first zone where destructive interference results in deep fading of the masking signal. In these locations a mobile may be able to detect base-stations outside of the first zone because the masking signal generated in the first zone will be insufficient to mask the base-stations in the second zone.

In attempting to establish connection to the base-station in the second zone the mobile will transmit a RACH (random access channel) at or near to full power. This high power signal may be considered undesirable in, for example, an aircraft cabin. It is also undesirable because it will generate interference in base stations other than the one to which it is attempting to affiliate.

Thus, in accordance with a second aspect of the invention connection inhibition apparatus comprises means to transmit a masking signal which transmits two or more signals which are mutually non-coherent. By providing two or more mutually non-coherent masking signals from separate antennas or antenna systems the problem of deep fading is alleviated or eliminated because the two or more sources of masking signal will be received over independent channels at the mobile receiver and will sum according to their independent powers in such a way that a deep fade will be experienced only in the unlikely event that all sources independently experience deep fading. Preferably, the apparatus includes in the first zone a first zone base-station to which the mobile communication equipment may establish connection.

In accordance with another aspect of the invention, means to transmit a masking signal transmits a spectrum with a discontinuity or notch at that part of the spectrum to be used by the first zone base-station. The preferred masking signal is a chirped waveform.

By doing this the masking signal will not mask the first zone base-station.

Preferably, the masking signal is a phase modulated by a randomising sequence and the preferred sequence is an M sequence.

According to a yet further aspect of the invention there is provided a coupling network for coupling a first and a second masking signal from a first masking signal source, a third masking signal from a second masking signal source and a transmitter signal to a first and a second antenna comprising; means to couple the first and the third masking signals to respective ones of the first and the second antenna, means to combine the transmitter signal and the second masking signal to provide a combined signal, and means to couple the combined signal to both antennas. This coupling network may be combined with the earlier aspects of the invention.

A yet further aspect of the invention provides a method for producing a notched chirped waveform for use as a masking signal in apparatus as in the earlier aspects comprising the steps of; providing a chirped waveform, identifying a part of the chirped waveform where a notch is required, applying a transform to the identified part to provide spectral components, deriving from the spectral components those that are to be nulled, applying an inverse transform to the spectral components to be nulled, and subtracting the inverse transformed spectral components from the chirped waveform to generate the notched chirped waveform.

Preferably, the chirped waveform is held in memory.

Preferably, the spectrum of the chirped waveform is also held in memory as a set of complex weights and further comprising the steps of; selecting from the set of complex weights a selection applicable to a desired notch, deriving from the selection a set of waveforms, and applying the set of waveforms to the chirped waveform to generate a notched chirped waveform.

BRIEF DESCRIPTION OF THE DRAWINGS

A specific embodiment of the invention will now be described, by way of example only, with reference to, and as illustrated by, the drawings in which.

DETAILED DESCRIPTION OF EMBODIMENTS

Figure 1:
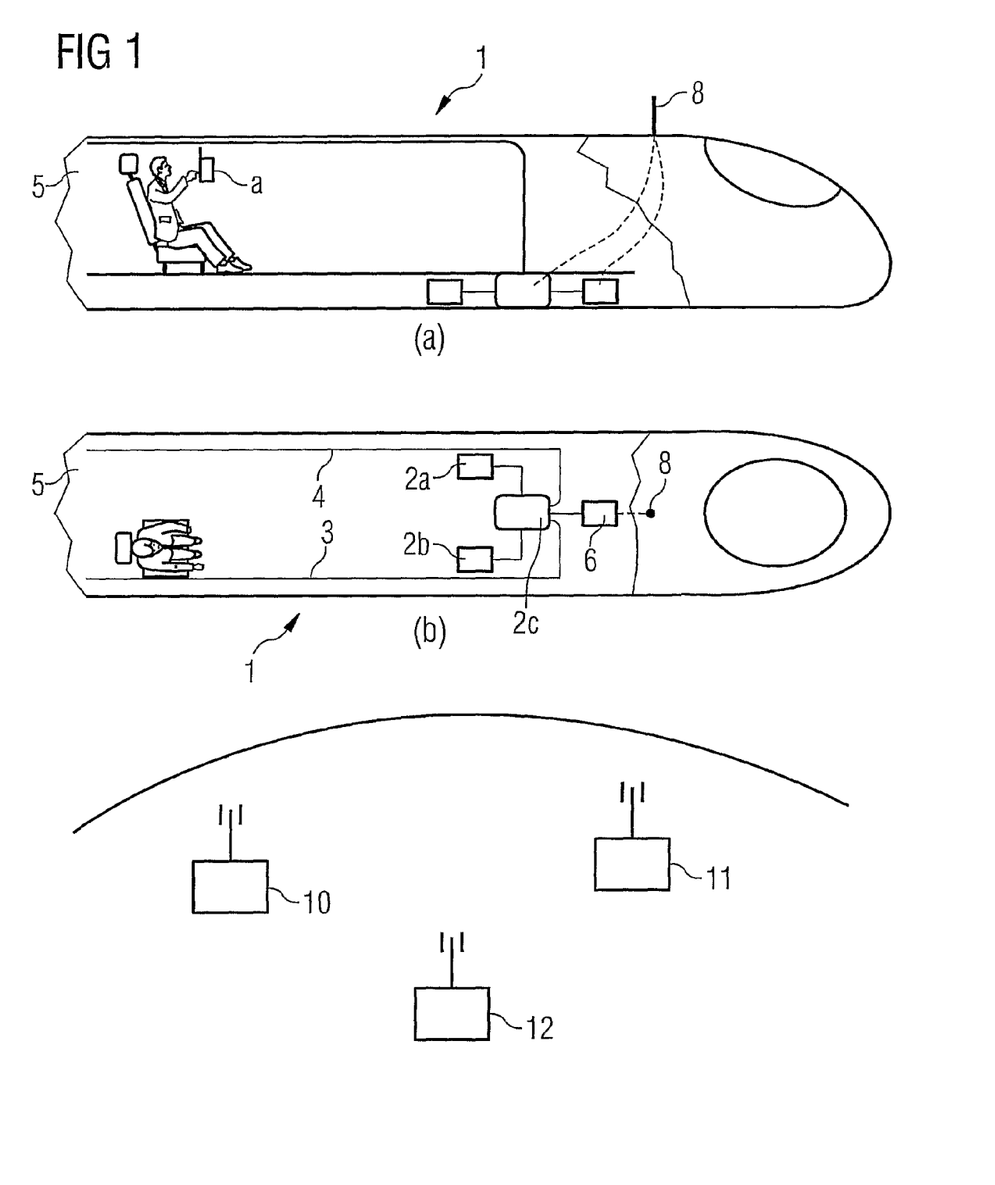
FIG. 1 shows in block diagram form apparatus in accordance with the invention being used in an aircraft cabin.

As is shown in FIG. 1 connection inhibition apparatus 1 comprises two masking signal generators 2a, 2b connected to antennas 3 and 4 formed by leaky feeders by a coupler network 2c located in an aircraft cabin 5.

The apparatus 1 is coupled to a base-station 6. The base-station 6 is coupled to both antenna 3 and 4 by the coupler network 2c. The base-station 6 is also connected via a base station controller function, to a further antenna 8 mounted on the exterior of the aircraft. The base-station 6 serves a cell formed by a first zone which is the cabin 5. Mobiles 9 connect to the base-station 6 and thus by the antenna 8 to a ground based communications network. This connection to the ground based communication network will typically be directed via a satellite communications link, wherein antenna 8 is a satellite antenna.

One or more further ground based mobile communications networks (these are not the same ground based communications networks as mentioned in the previous paragraphs) include a number of base-stations 10 to 12 serving different geographic areas on a cellular basis. The area outside of the cabin is referred to in this description as the second zone.

The chirped waveform generator may take a number of forms. In the specific embodiment it relies upon a number of stored values for the chirped waveform which are accessed and used to drive appropriate circuitry. Alternatively, the chirped waveform may be directly generated and used. For an understanding of the preferred embodiment, the directly generated alternative will be first described with reference to FIG. 2.

Figure 2:
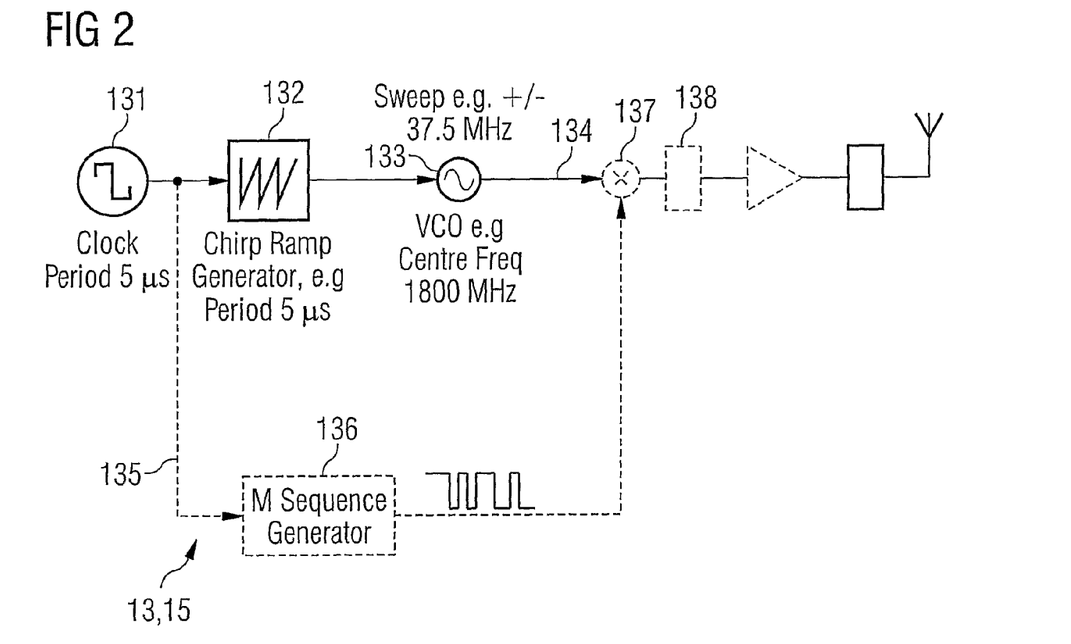
FIG. 2 shows more detail of the chirped waveform generator of the apparatus of FIG. 1.

As is shown in FIG. 2, the chirped waveform generator 13 comprises a clock 131 having a period of 5 microseconds feeding a clock signal to a chirp ramp generator 132 of a period of again 5 microseconds. The output ramp is applied to modulate a sinusoidal signal produced by a voltage controlled oscillator 133. The voltage controlled oscillator 133 has a centre frequency of 1842.5 MHz. This produces an output chirped waveform 134 which may be applied to the transmitter sections.

However, in an enhancement to this basic embodiment, which provides a chirped waveform that is preferred, additional circuitry is provided. This is represented in the figure by the broken outline 135. This takes the clock signal to a randomising sequence generator 136 which in the preferred form is an M sequence generator. This is used to modulate the chirped waveform 134 to provide an M sequence modulated chirped waveform via mixer 137 which is applied to the transmitter sections.

Figure 3:
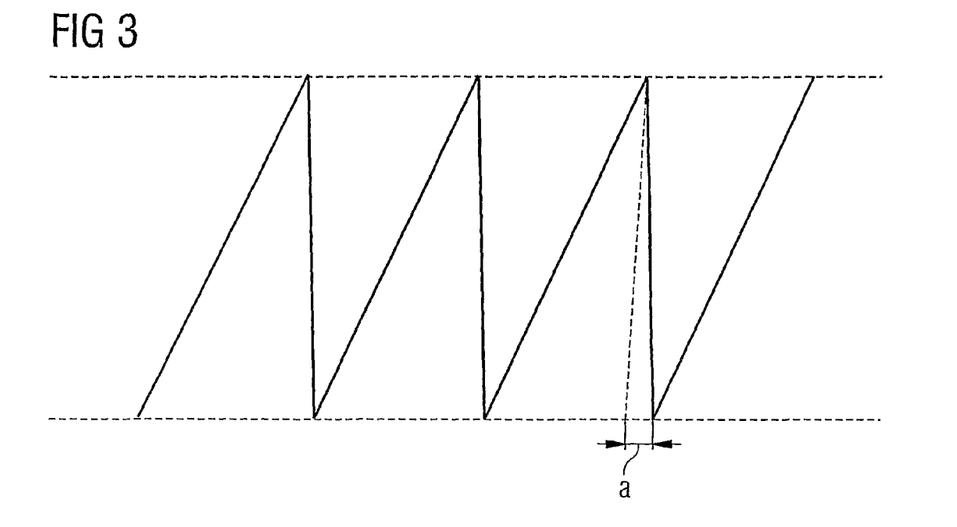
FIG. 3 shows a ramp waveform used in the generation of a chirped waveform.

The ramp generated waveform is shown in more detail in FIG. 3 and it can be seen that it is a sawtooth waveform with a rapid flyback period a. This establishes in conjunction with the VCO, the flyback period of the resultant chirped waveform 134.

Figure 4:
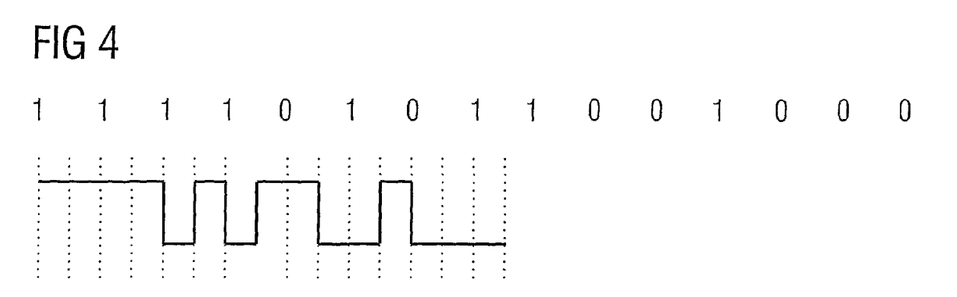
FIG. 4 shows an M sequence.

FIG. 4 shows the M sequence generator produce a binary waveform of constant amplitude. The M sequence is also known as a shift register sequence and it is a repeating pattern of length $2^n-1$. The clock 131 clocks the M sequence generator 136 such that in the period of one chirp, one M sequence element is produced. The effect of this when mixed at the mixer 137 with the chirped waveform is that the chirped waveform is either inverted or not inverted for a single period of the chirped waveform. Thus, the period of an element of the binary sequence is, preferably, an integer multiple of the period of a chirp used to form the chirped waveform. It is also preferred that the time of transition of one element of the binary sequence to the next is arranged substantially to coincide with the flyback period of the chirped waveform. The effect of the M modulation is to biphase modulate the chirped waveform. It produces a train of waveforms which avoid deep fading within the first zone by ensuring diversity through non-coherent combining between the outputs of two or more independent generators received over separate radio paths.

In a further preferred enhancement to the chirp waveform generator an amplitude windowing function is applied by a windowing means 138 shown in broken outline. This is an enhancement applicable to both alternatives.

Figure 5:
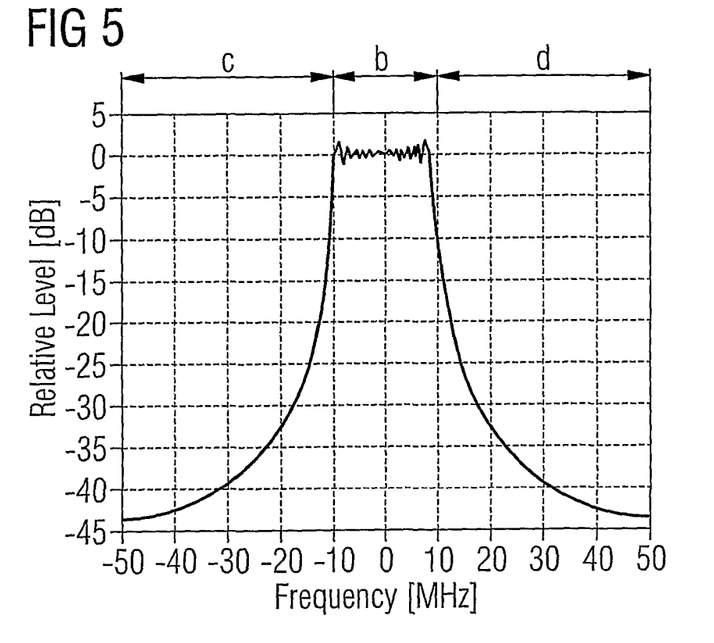
FIGS. 5 to 8 are explanatory figures concerning the generation of a masking signal.
Figure 6:
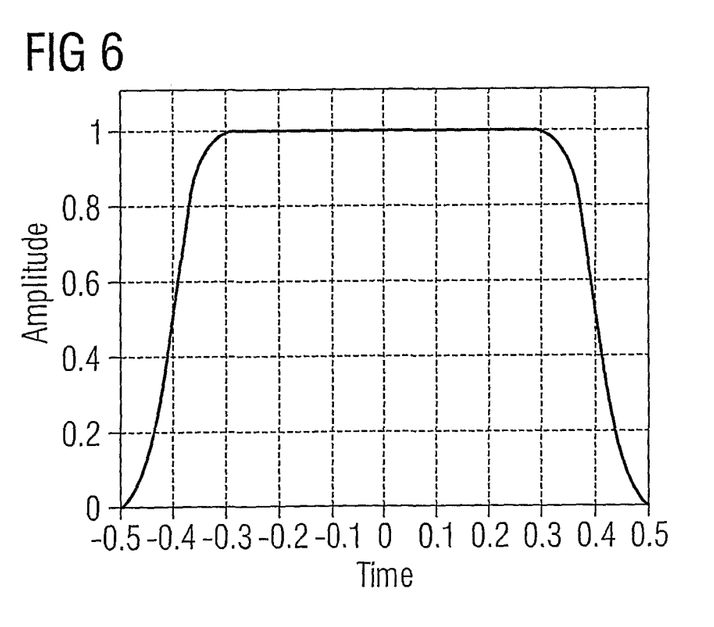
Figure 7:
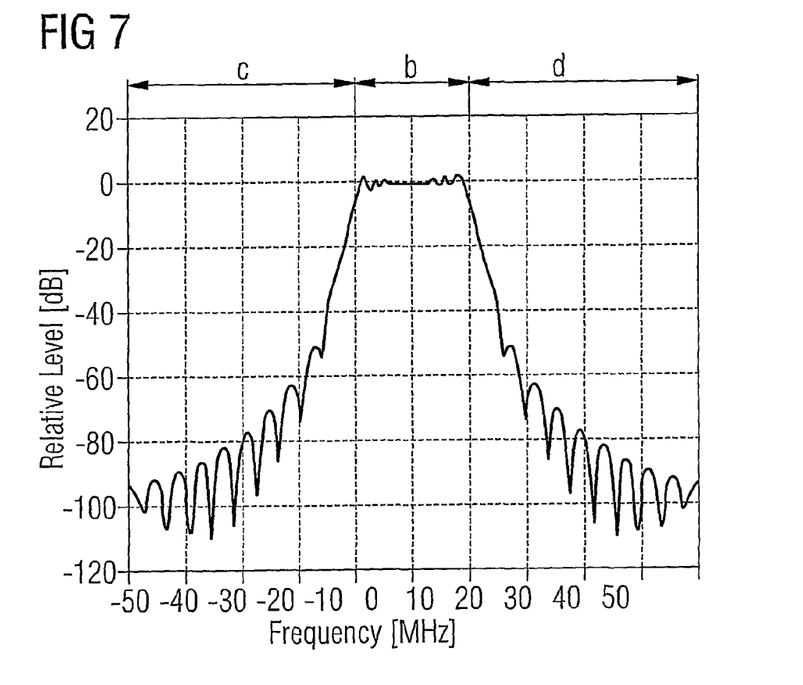

FIG. 5 shows the spectrum of a chirped waveform and FIG. 6 a windowing function to be applied to the chirped waveform by the windowing means 138. This windowing function has a raised cosine time domain function with a parameter k determining the proportion of the window that follows the raised cosine function. In the illustrated example k=0.4 but other window functions may be used. FIG. 5 has a vertical axis of relative level in dB and the horizontal axis is frequency running from −50 to +50 MHz relative to the centre frequency. The nominal bandwidth of the signal is ±10 MHz. When the window is applied to the waveform of FIG. 5 it produces a relatively flat central region (−10 to +10 MHz) and creates a relatively fast roll off of the signal spectrum outside of the central portion to provide the windowed chirped spectrum of FIG. 7 (In this case it relates to a windowed chirp where k=0.1). It will be seen that a comparison of the central portions b of the waveforms in FIGS. 5 and 7 show that the flatness is improved. Observing the differences in the scales of the vertical axis in FIGS. 5 and 7, it will be also noticed that the roll-off over the regions c and d is more rapid. The signal is no longer has a constant envelope but the peak to mean ratio is only increased to 0.28 dB.

Figure 8:
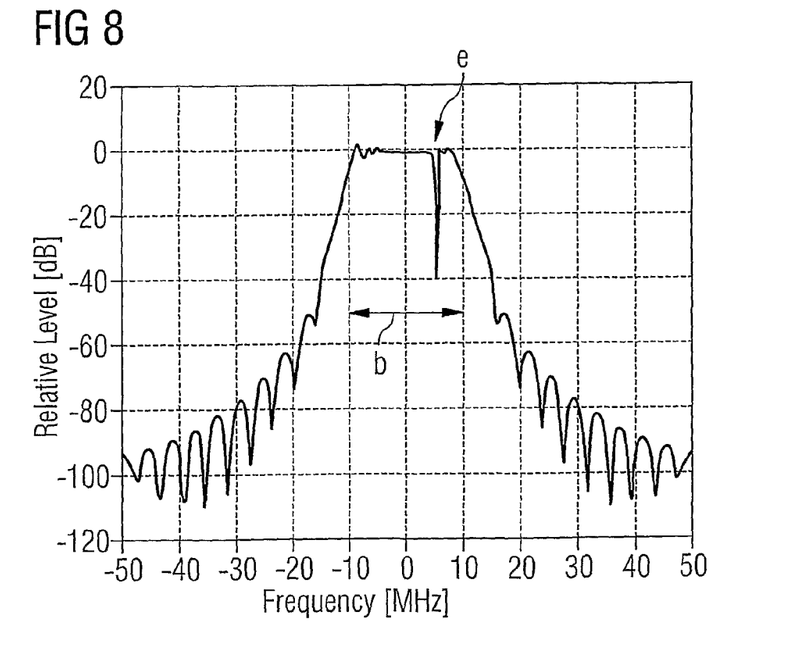

The chirped waveform and the windowed chirped waveform whose spectra are illustrated in FIGS. 5 and 7 respectively may be used in embodiments which are required merely to inhibit connection of equipment in the first zone to base-stations in the second. However, in a further preferred enhancement the chirped waveform or the windowed chirped waveform is generated with a hole or discontinuity in its profile which substantially co-incides with the operating frequency of the base-station serving the first zone, that is to say, the base-station 6 of FIG. 1. This is illustrated by FIG. 8 which shows a windowed chirped waveform with a notch, discontinuity or hole e which co-incides with the operating band of the base-station 6 at an example frequency of about +6 MHz relative to the centre frequency In essence therefore, the waveform will mask or jam the signals across the communications system band f except those within the notch e.

Notch generation can be done by taking a Fourier transform of the chirped waveform, nulling the frequencies where the hole is required and performing an inverse Fourier transform of the result. This gives rise to a chirp with a notch as shown in FIG. 8. This notched chirped waveform is used in a later embodiment of the apparatus using values for the waveform held in look-up tables.

Ideally, the hole will have a depth commensurate with the precision of the quantisation used in the sample. However, with a power amplifier which will be non-ideal, intermodulation products will tend to "in-fill" the hole. Thus in FIG. 9, the hole has a null of depth 40 dB when the amplifier has a 6 dB back off. The peak to mean ratio is about 1.25 dB.

It will be appreciated that more than one hole, notch or discontinuity may be provided depending on the requirements of the base-station or base-stations serving the zone.

In summary a number of alternative masking signals may be generated by various alternative embodiments of the invention.

In a first masking signal a chirped waveform is applied to the transmitter section.

In a second masking signal a chirped waveform is windowed to provide a windowed chirped waveform to be applied to the transmitter section.

A third or fourth masking signal is provided by providing a notched version of the first and second.

A yet further set of types is where the earlier types are modulated by a randomising sequence which in its preferred form is an M sequence. This ensures signal diversity to prevent deep fading within the first zone of the masking signals.

In the preferred embodiment, the masking signal, whatever its type, whether the chirped waveform, the windowed chirped waveform or the windowed chirped and notched waveform is pre-loaded into look-up tables held in memory and the values output to generate the waveforms. This embodiment will be described with reference to FIG. 9. It comprises a square wave signal generator 17 feeding a counter 18. The count value is input to look-up tables 19 and 20 in the respective phase and quadrature signal branches.

Figure 9:
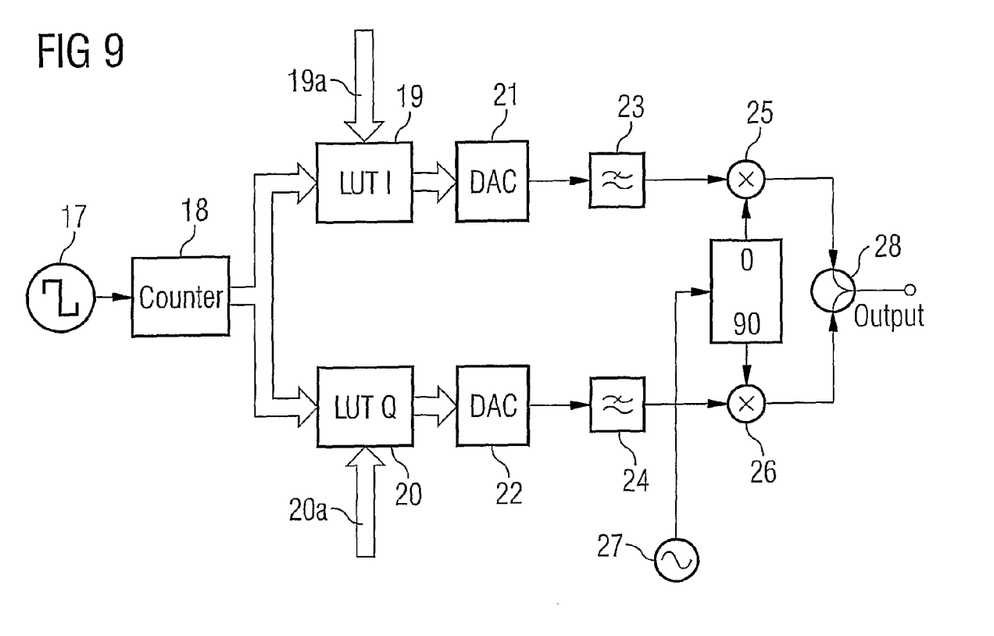
FIG. 9 shows an alternative embodiment of the apparatus in which a masking signal is held in a memory structure in the form of look-up tables.

The look-up tables 19 and 20 hold a representation in coded form of a masking signal and output the relevant part of the look-up tables in response to the count from the counter 18. The relevant part is then passed to respect digital to analogue converters 21 and 22. The look-up tables are populated with data by use of the lines 19a and 20a. The data may be loaded at configuration of the equipment or when it is in use in an adaptive manner.

The resultant analogue signal is passed via low pass filters 23 and 24 to respective mixers 25, 26.

At the mixers 25, 26 the signals are mixed with an RF signal provided by a signal generator 27. The in phase and quadrature signals are combined by combiner 28 before being output to the transmitter sections 14 and 15.

The coded representations of the signal held in the look up tables for the two chirp generators differ according either to the phase or generator polynominal used for the M sequence. This is to ensure that the resultant signals transmitted in to the cabin are non-coherent to avoid the above mentioned fading problem Thus, when the mobile is switched on in the cabin 5 (zone 1) it scans the bandwidth b of the earlier described chirped windowed and notched waveform. Signals emanating from the ground based base-stations 10 to 12 are not distinguishable from the masking signal. Scanning the bandwidth the mobile will arrive at the transmissions at the frequency of the notch e emanating from the base-station 6. Following the normal initialisation functions of the mobile phone, having found only one valid mobile phone downlink signal, a connection will then be established.

Diversity of the output masking signals is ensured by the use of the M sequence modulation of the stored waveform wherein the M sequence generator polynominals or code phases across two or more masking signal generators are different In this way, any alignment of carrier phase on the individual masking signal outputs as received over separate radio paths from separate transmitting antenna at a mobile antenna will be modulated so that interference is sometimes constructive, sometimes destructive, resulting in an effective power-wise addition of the signals.

It will be appreciated that in the case of mobile cellular telecommunications there are a number of standards that are applied in different parts of the world. It is possible that passengers in the aircraft cabin may have mobiles which operate according to different standards. It may be necessary to provide masking signals which mask the transmissions according to the different standards. Furthermore, it may be desirable to apply different masking signals as the aircraft travels and crosses different geographical areas. For example, as an aircraft flying from Europe enters range of a mobile telecommunications system operating in the USA.

Figure 10:
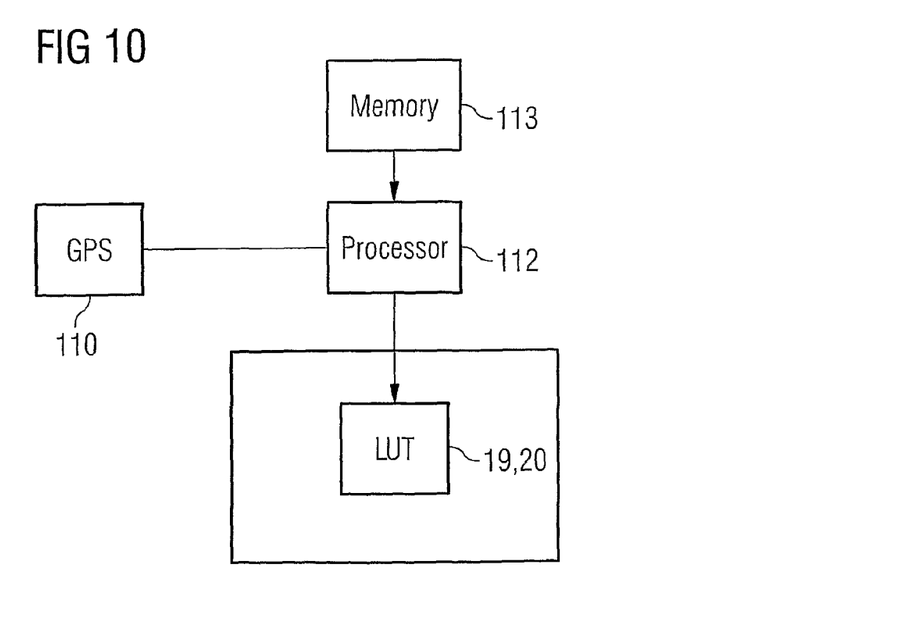
FIG. 10 shows a yet further embodiment of the apparatus in which a location of the zone is determined and used to select and apply an appropriate masking signal scheme.

FIG. 10 shows in block diagram form an embodiment which determines a location of the aircraft and from that determined location selects a particular masking signal scheme from memory which is then applied. It is a modification to the apparatus shown in FIG. 9 where the values held in lookup tables 19,20 are manipulated or selected dependent upon a determined location. The apparatus includes a global positioning receiver 110 which determines a current location of the aircraft and passes that location to a processor 112. The processor 112 accesses memory 113 which holds a set of masking schemes and selects a masking scheme appropriate for the determined location and wherein the frequency of the oscillator 27 may also be selected dependent upon that determined location. The masking scheme is then downloaded to the lookup tables 19, 20 and applied as before. (Alternatively, the lookup tables may hold a number of schemes and the scheme to be operated may be selected by the processor 112.)

Figure 11:
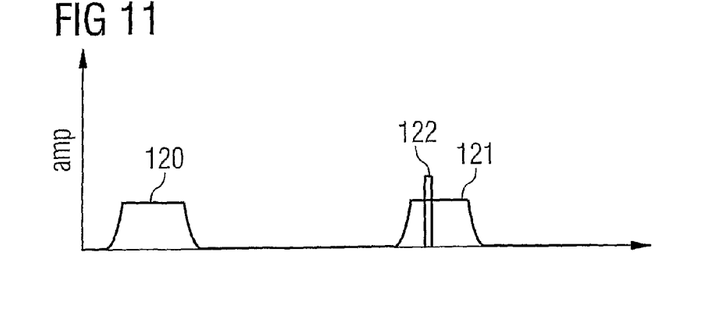
FIG. 11 is an explanatory figure showing the use of the masking signals to cater for the masking of different bands.

For some less complex arrangements, the notch in the chirped waveform may be dispensed with by arranging for the transmitted power of the base-station 6 to rise above the chirped waveform of the masking signal. In FIG. 11 we have a depiction of two bands being blocked. A lower band appropriate for a first communications system is masked by chirped waveform 120 and a higher band corresponding to a second communications system or standard is masked by the masking signal 121. The signal 122 is that generated by the on-board base-station 6 and it will be seen that it exceeds the power level of the masking signal 121.

The coupler network for such an embodiment is preferred to be such that the masking signal 120 is made diverse, the base-station signal 122 is not diverse (since then only one base-station is required) and the masking signal 121 is thus also non-diverse.

To achieve this the coupling network 2c is arranged to apply a first low band masking signal to the first antenna 3 from the first masking signal generator 2a, and to apply a second low band masking signal to the second antenna 4 from the second masking signal generator 2b where the masking signals are diverse.

The coupling network 2c also combines a signal transmitted from the base-station 6 with a high band masking signal from one of the masking signal generators 2a or 2b and then applies the combined signal to both the antennas 3 and 4.

The coupling network 2c is also required to couple signals from the mobiles being used in the aircraft cabin 5 from the antennas 3 and 4 to the receiver section of the base-station 6.

Figure 12:
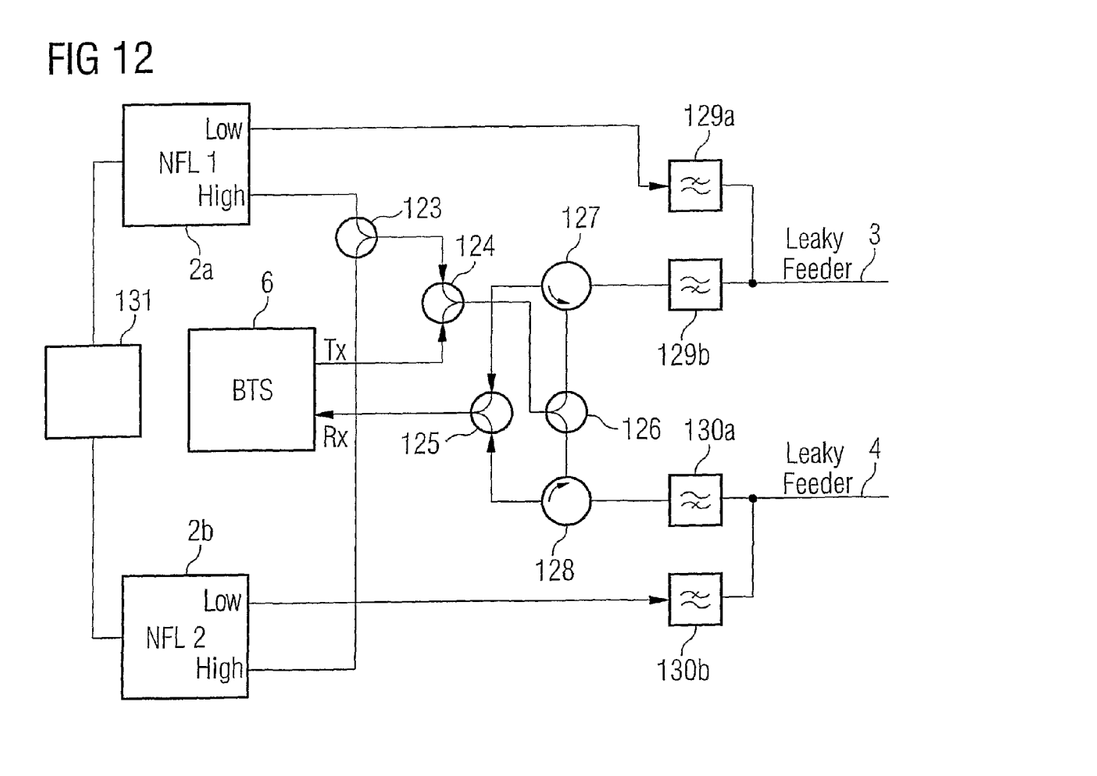
FIGS. 12 to 14 show various embodiments of coupling networks for use in the apparatus.

One embodiment of the coupling network 2c is shown in FIG. 12. It comprises a network of combiners 123 to 126, circulators 127 and 128, and duplexers 129 and 130. The duplexers 129 and 130 are formed of two complimentary low and high pass filters denoted a and b respectively. In order to provide a preferred degree of redundancy a backup switching processor 131 is provided coupled to each of the masking signal generators 2a, 2b. This enhancement of the basic configuration will be described later.

It will be seen that each of the masking signal generators 2a, 2b comprise a first and second output for the low and high bands respectively. Considering the first low band outputs these are coupled to the low pass filters 129*a* and 130*b* of the diplexers and thence coupled to the antennas 3 and 4. These signals are diverse.

It will be seen that the base-station 6 has a transmit output and a receive input. The masking signal generator 2*a* high band masking signal is coupled to a combiner 123. This masking signal generator is normally used to produce the masking signal but to cope with a potential failure backup switching processor 131 may detect the failure and command the other masking signal generator 2*b* to provide a high band masking signal. Thus, the other branch of the combiner 123 is connected to the other masking signal generator 2*b*. The output of the combiner 123 is the high band masking signal and it is passed to the combiner 124. Another input of the combiner 124 is coupled to the transmit output of the base-station 6. The combined signal is passed to a divider 126 to divide the signal. Each division of the signal is passed to a respective circulator 127, 128 and then passed via the high pass filters 130*a* and 129*b* to respective antennas 3 and 4. Thus, a combination of the base-station transmitter signal and the high band masking signal is transmitted into the cabin 5. This signal is not diverse in the sense that the transmitted waveform is identical across the two antennas in such a way that destructive interference is possible The received signals are coupled from the antennas 3, 4 via the high pass filters 129*b* and 130*a* to the circulators 127, 128. These couple the received signals to the combiner 125 which provides a combined output to the received signal input of the base-station 6.

Figure 13:
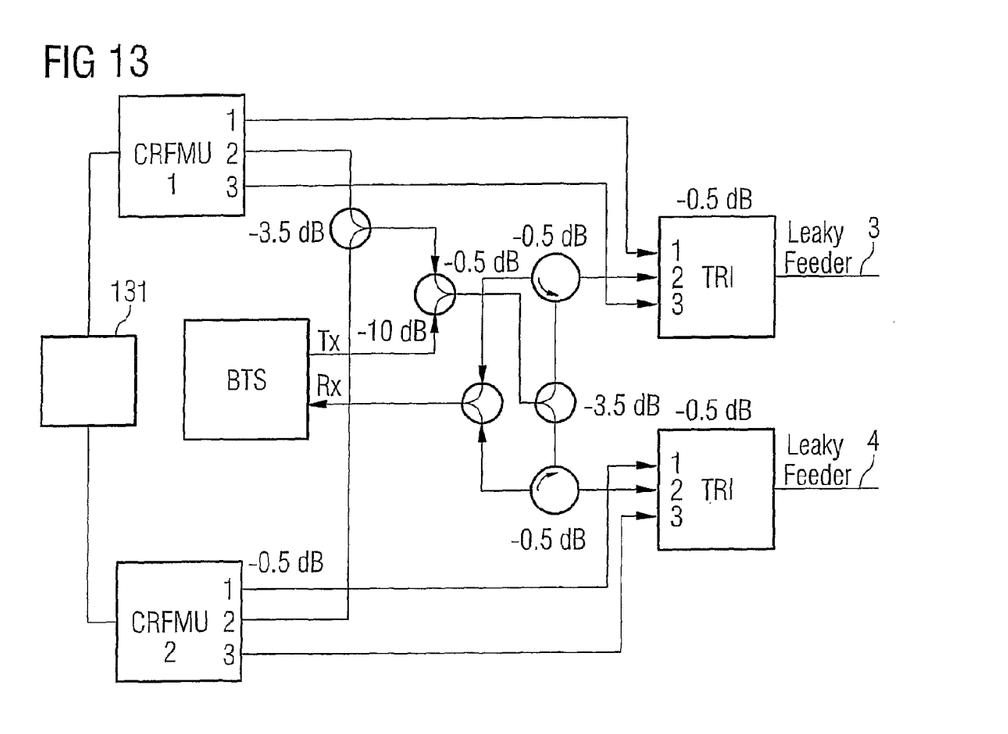

FIG. 13 shows a similar arrangement to cater for three bands 1, 2 and 3 In this case the base-station 6 transmits on band 2 which is the middle band. (The diplexers are replaced with triplexers in this embodiment.)

Figure 14:
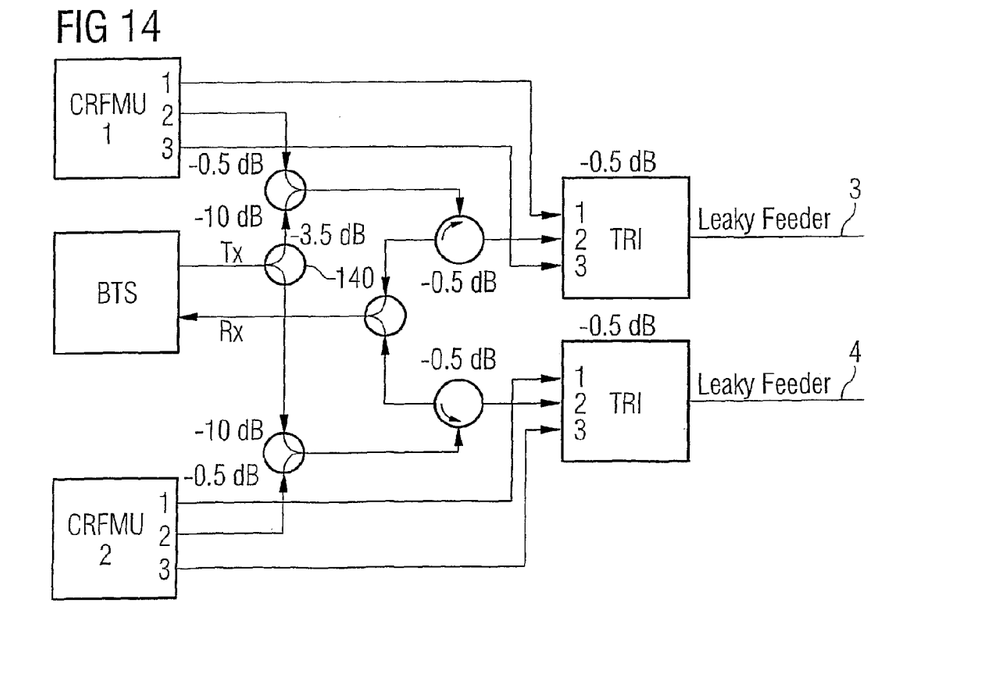

FIG. 14 shows an arrangement which provides a notched masking signal. In this case the base-station transmitter signal is divided by a divider before being combined with the masking signals in the middle band. The combined signals are diverse and coupled to the antennas via circulators and the triplexers to the antennas 3 and 4.

In the description of the use of the Fourier transform to create the hole or notch in the masking spectrum, it should be noted that other transform and frequency nulling methods may be used which transform the signal into spectral components to allow the pertinent components to be cancelled before the inverse transform is applied.

It may also be possible to focus the available processing power to only the frequencies of the notch. An alternative method of generating the notch operates by producing a copy of the normal chirped waveform that is limited in bandwidth to the range of frequencies to be notched and subtracting it from the original normal chirped waveform. Because the waveform is repetitive, the spectrum of this signal will consist of discrete lines with frequencies that are a multiple of the reciprocal of the total period of the waveform. Once the band to be notched has been determined in dependence upon the operating frequency of the base station, all of the spectral line components to be nulled can be determined. The complex amplitudes of each of these components can be determined by performing the fourier summation according to the applicable frequency. Once all of the complex amplitudes over the bandwidth to be nulled have been determined, the relevant complex sinusoids with the correct amplitudes, start phases and frequencies can be computed and subtracted from the normal chirped waveform in order to generate the notched waveform.

In a further improved method, the entire spectrum of the normal chirped waveform can be stored in a further look up table of complex weights. When it is desired to produce a notch in a particular band, the already available required weights can be selected out of those stored. These can then be used to generate the relevant complex sinusoids with the correct amplitudes, start phases and frequencies and subtract them from the normal chirped waveform in order to generate the notched waveform.

What is claimed is:

1. Connection inhibition apparatus to prevent mobile communication equipment in a first zone connecting to a base-station in a second zone outside the first zone, the apparatus comprising:
    means to transmit a masking signal at a frequency or frequencies of the base-station within the first zone to mask transmissions from the second zone to inhibit connection thereto wherein the masking signal is at least one chirped waveform,
    wherein the means to transmit a masking signal substantially does not transmit at a frequency or frequencies allocated to a base-station serving the first zone.

2. Apparatus as claimed in claim 1, wherein the masking signal is a windowed chirped waveform.

3. Apparatus as claimed in claim 2, wherein the windowed chirped waveform is phase modulated.

4. Apparatus as claimed in claim 1, wherein the masking signal is a chirped waveform modulated by a randomising sequence.

5. Apparatus as claimed in claim 4, wherein the randomising sequence is an M sequence.

6. Apparatus as claimed in claim 1, wherein the means to transmit a masking signal transmits a plurality of masking signals arranged to be mutually non-coherent in order to prevent fading in the first zone.

7. Apparatus as claimed in claim 1, wherein the means to transmit a masking signal transmits over a spectrum of frequencies.

8. Apparatus as claimed in claim 1, wherein the means to transmit a masking signal transmits a spectrum of frequencies with a hole in the spectrum which coincides with the allocated frequency.

9. Apparatus as claimed in claim 1, wherein the means to transmit a masking signal transmits a train of chirped waveforms.

10. Apparatus as claimed in claim 2, wherein the chirp modulated waveform is further bi-phase modulated by the elements of a binary sequence.

11. Apparatus as claimed in claim 10, wherein the period of an element of the binary sequence is an integer multiple of the period of a chirp used to form the chirped waveform.

12. Apparatus as claimed in claim 11, wherein a time of transition of one element of the binary sequence to the next is arranged substantially to coincide with a flyback period of the chirp.

13. Apparatus as claimed in claim 10, wherein the binary sequence is a repeated finite length binary sequence.

14. Apparatus as claimed in claim 13, wherein the finite length binary sequence is an M sequence.

15. Apparatus as claimed in claim 10, wherein the binary sequence is a random sequence.

16. Apparatus as claimed in claim 1, wherein the chirped waveform is windowed by application of an amplitude windowing function.

17. Apparatus as claimed in claim 16, wherein the windowing function has a raised cosine time function.

18. Apparatus as claimed in claim 1, wherein the masking signal is derived by performing a transform on a chirped waveform to provide spectral components, nulling spectral components coinciding with the allocated frequency or frequencies and performing an inverse transform to provide the masking signal spectrum with a hole.

19. Apparatus as claimed in claim 18, wherein the transform is a Fourier transform process.

20. Apparatus as claimed in claim 1, wherein the masking signal is derived by performing a Fourier transform on a complete sequence of chirps modulated by one finite length binary sequence, nulling spectral components coinciding with the allocated frequency or frequencies and performing an inverse Fourier transform to provide the masking signal.

21. Apparatus as claimed in claim 20, wherein the finite length binary sequences that modulate the chirped waveform are arranged to operate with different mutual phases in at least two signals.

22. Apparatus as claimed in claim 21, wherein the finite length binary sequences that modulate the chirped waveform are generated using different polynomials in M sequence generators.

23. Apparatus as claimed in claim 1, wherein the masking signal is held as a set of values in memory.

24. Apparatus as claimed in claim 23, further comprising a digital to analogue converter to convert the values in memory to an analogue form.

25. Apparatus as claimed in claim 24, wherein the memory is a look-up table.

26. Apparatus as claimed in claim 25, wherein the look-up table is addressed by a counter.

27. Apparatus as claimed in claim 1, further comprising means to determine a location of the first zone, wherein the means to generate the masking signal is responsive to a determined location to generate a masking signal appropriate to the second zone associated with the determined location.

28. A method of inhibiting connection of mobile communication equipment in a first zone to a base-station in a second zone outside the first zone, comprising:
transmitting a masking signal within the first zone at a frequency or frequencies of the base-station to mask transmissions emanating therefrom to inhibit connection thereto wherein the masking signal is a chirped waveform, and
providing a wide bandwidth signal with a hole or holes in its spectrum coinciding with a frequency or frequencies allocated to a base-station or base-stations serving the first zone.

29. A method as claimed in claim 28, wherein the masking signal has wide bandwidth.

30. A method as claimed in claim 29, wherein the wide bandwidth signal is derived from a chirp.

31. A method as claimed in claim 28, wherein the masking signal is formed from at least two signals of randomly varying phase relationship.

32. A method of providing a windowed chirp with a hole in its spectrum for use in connection inhibiting apparatus to prevent mobile communication equipment in a first zone connecting to a base-station in a second zone outside the first zone, the apparatus comprising means to transmit a masking signal at a frequency or frequencies of the base-station within the first zone to mask transmissions from the second zone to inhibit connection thereto wherein the masking signal is at least one chirped waveform, the method comprising:
forming a chirp;
applying an amplitude window function to the chirp to provide a windowed chirp
performing a Fourier transform to the windowed chirp to provide a transformed windowed chirp;
nulling spectral components of the transformed windowed chirp co-inciding with frequencies allocated for use by a base-station serving the first zone; and performing an inverse Fourier transform to provide a windowed chirp with a hole.

33. A method as claimed in claim 32, further comprising forming a masking signal that includes applying a randomising sequence to a chirped waveform.

34. A method as claimed in claim 33, wherein the randomising sequence has a finite length.

35. A method as claimed in claim 34, wherein the randomising sequence has infinite length.

36. A method as claimed in claim 33, wherein the randomising sequence is an M sequence.

37. A method as claimed in claim 32, wherein a location is determined and a masking signal is generated based on the determined location.

38. Connection inhibition apparatus to prevent mobile communication equipment in a first zone connecting to a base-station in a second zone outside the first zone, the apparatus comprising:
means to transmit a masking signal within the first zone to mask transmissions from the second zone wherein the masking signal comprises a spectrum having a hole at a frequency at which a base-station in the first zone operates such that connection to base-stations in the second zone are inhibited and that connection to a base-station in the first zone are permitted.

39. Connection inhibition apparatus to prevent mobile communication equipment in a first zone connecting to a base-station in a second zone outside the first zone, the apparatus comprising:
means to transmit a masking signal at the frequency or frequencies of the base-station within the first zone to mask transmissions from the second zone to inhibit connection thereto wherein the masking signal comprises two or more mutually non-coherent signals mutually non-coherent in order to prevent fading in the first zone.

40. Apparatus as claimed in claim 38, wherein the masking signal comprises two or more mutually non-coherent signals modulated by randomising sequences.

41. Apparatus as claimed in claim 38, wherein the masking signal comprises two or more mutually non-coherent signals modulated by randomising sequences.

42. Apparatus as claimed in claim 40, wherein the randomising sequence is a finite length randomising sequence.

43. Apparatus as claimed in claim 41, wherein the randomising sequence is an infinite length randomising sequence.

44. Apparatus as claimed in claim 42, wherein the randomising sequence is an M sequence.

45. Apparatus as claimed in claim 43, wherein the randomising sequence is an M sequence.

46. Apparatus as claimed in claim 41, wherein the masking signal comprises a chirped waveform.

47. A coupling network for coupling a first and a second masking signal from a first masking signal source, a third masking signal from a second masking signal source which signal being diverse relative to the first masking signal and a transmitter signal to a first and a second antenna, comprising:
means to couple the first and the third masking signals to respective ones of the first and the second antenna;
means to combine the transmitter signal and the second masking signal to provide a first combined signal; and
means to couple the combined signal to both antennas.

48. Apparatus as claimed in claim 47, wherein the second masking signal source provides a fourth masking signal diverse to the second masking signal and wherein the masking signals include a notch at the frequency of the transmitter signal and further comprising a combiner to combine the transmitted signal to both the second and the fourth masking signals to provide first and second combined signals and means to couple the first and second combined signals to respective ones of the first and second antennas.

49. A method for producing a notched chirped waveform for use as a masking signal comprising the steps of:
  providing a chirped waveform;
  identifying a part of the chirped waveform where a notch is required;
  applying a transform to the identified part to provide spectral components;
  deriving from the spectral components those that are to be nulled;
  applying an inverse transform to the spectral components to be nulled; and
  subtracting the inverse transformed spectral components from the chirped waveform to generate the notched chirped waveform.

50. A method as claimed in claim 49, wherein the chirped waveform is held in memory.

51. A method as claimed in claim 50, wherein the spectrum of the chirped waveform is also held in memory as a set of complex weights and further comprising the steps of:
  selecting from the set of complex weights a selection applicable to a desired notch;
  deriving from the selection a set of waveforms; and
  applying the set of waveforms to the chirped waveform to generate a notched chirped waveform.

* * * * *